United States Patent [19]

Irwin

[11] Patent Number: 4,941,566

[45] Date of Patent: Jul. 17, 1990

[54] SPIRAL CONVEYOR WITH TEXTURED CAPSTAN

[76] Inventor: Guy L. Irwin, 512 Oreland Mill Rd., Oreland, Pa. 19075

[21] Appl. No.: 312,810

[22] Filed: Feb. 21, 1989

[51] Int. Cl.⁵ .............................................. B65G 21/18
[52] U.S. Cl. ................................... 198/778; 198/688.1
[58] Field of Search ....................... 198/778, 688.1, 698

[56] References Cited

U.S. PATENT DOCUMENTS

| | | | |
|---|---|---|---|
| 2,980,121 | 4/1961 | Schuricht et al. | 198/778 X |
| 3,348,659 | 10/1967 | Roinestad | 198/778 |
| 4,741,430 | 5/1988 | Roinestad | 198/778 |
| 4,798,062 | 1/1989 | Lipinski et al. | 198/778 X |

Primary Examiner—Robert J. Spar
Assistant Examiner—Lyle Kimms
Attorney, Agent, or Firm—Thomas R. Morrison

[57] ABSTRACT

A capstan for a spiral conveyor includes a plurality of grooves in the external surface thereof for controlling the driving friction between the outer surface of the capstan and the inner edge of a conveyor belt in contact with it. In one embodiment of the invention, the grooves are oriented vertically such that they contact the inner edge at an angle relative to motion therebetween. In another embodiment, the grooves are inclined to the vertical such that they contact the inner edge at right angles to the relative motion. In a further embodiment, the grooves are inclined generally parallel to the relative motion.

10 Claims, 7 Drawing Sheets

Fig. 2

SPIRAL CONVEYOR WITH TEXTURED CAPSTAN

BACKGROUND OF THE INVENTION

The present invention relates to material handling equipment and, more particularly, to a conveyor system having a spiral portion.

One type of conveyor is known having a conveyor belt in which a portion of the conveyor belt is formed into an ascending or descending spiral. The ends of the spiral are connected together through an out-run, a return-run and an in-run. The conveyor is at least partly driven by a capstan rotating within the spiral portion and contacting the inner edge of the conveyor belt as it traverses the spiral. Frictional forces are controlled by a sprocket drive on the out-run which controls longitudinal tension in the conveyor belt. In effect, the amount of drive is controlled by the amount of longitudinal tension applied to the out-run. This is similar to a nautical winch in which a plurality of turns in the bight of a rope is wound on a rotating reel. If the rope exiting the reel is left slack, the reel turns with insufficient friction with the rope to pull the incoming rope. If a moderate tension is applied to the exiting rope, a substantial force is applied to the incoming rope.

Spiral conveyors are disclosed in U.S. Pat. No. 3,348,659 (now expired) and 4,078,655.

Spiral conveyors of the type described above, and disclosed in the referenced patents, are frequently used in food-preparation establishments to hold freshly baked goods in a cooling environment for a substantial time prior to a succeeding operation such as, for example, packaging. The food-preparation industry shares with other industries the desire for improved productivity. One approach to improved productivity includes increasing the throughput of spiral conveyors. Throughput is achieved by increasing the linear speed of the conveyor belt.

As the linear speed of the conveyor belt increases, it becomes increasingly difficult to couple enough torque through the frictional contact between the outer surface of the capstan and the inner edge of the belt without applying destructive tension in the conveyor belt.

OBJECTS AND SUMMARY OF THE INVENTION

It is an object of the invention to provide a spiral conveyor which overcomes the drawbacks of the prior art.

It is a further object of the invention to provide an interface between a capstan of a spiral conveyor and an inner surface of a conveyor belt which increases the drive force applied to the conveyor belt.

It is a still further object of the invention to provide a grooved outer surface on a capstan of a spiral conveyor. The grooved outer surface interacts with the inner surface of a conveyor belt to increase driving forces without requiring excessive belt tension.

Briefly stated, the present invention provides a capstan for a spiral conveyor which includes a plurality of grooves in the external surface thereof for controlling the driving friction between the outer surface of the capstan and the inner edge of a conveyor belt in contact with it. In one embodiment of the invention, the grooves are oriented vertically such that they contact the inner edge at an angle relative to motion therebetween. In another embodiment, the grooves are inclined to the vertical such that they contact the inner edge at right angles to the relative motion. In a further embodiment, the grooves are inclined generally parallel to the relative motion.

According to an embodiment of the invention, there is provided a spiral conveyor, comprising: a conveyor belt, the conveyor belt being of a type that is capable of telescoping at one edge to conform to a spiral shape, a capstan, the capstan being generally cylindrical with a vertical central axis, means for rotating the capstan about the vertical central axis, a peripheral surface on the capstan, at least a portion of the conveyor belt being conformed in the spiral shape with an inner edge thereof contacting the peripheral surface, means for applying a longitudinal tension to the conveyor belt at least in a vicinity of a departure of the conveyor belt from the spiral shape, the inner edge including a plurality of protuberances, a plurality of grooves in the peripheral surface, and the plurality of grooves being shaped and disposed to interact with the plurality of protuberances to modify a cumulative friction between the inner edge and the peripheral surface.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
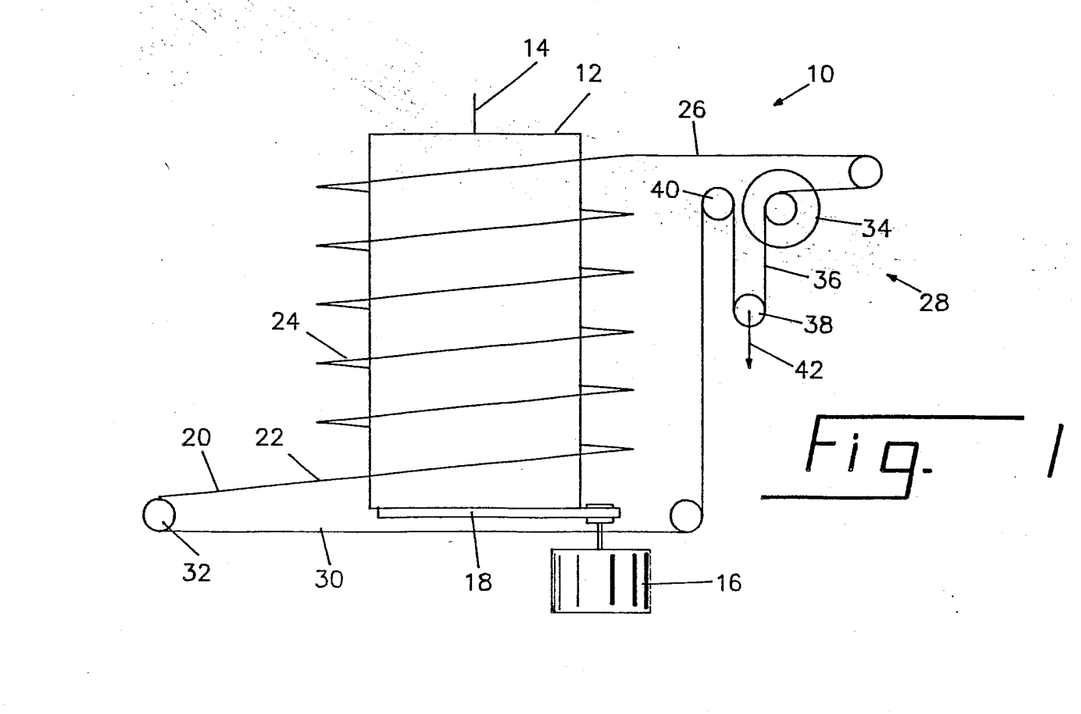
FIG. 1 is a schematic diagram of a spiral conveyor in which the present invention may be employed.

Referring to FIG. 1, there is shown, generally at 10, a spiral conveyor system to which the present invention may be applied. A capstan 12 is rotated about its vertical longitudinal axis 14 by any convenient means such as, for example, an electric motor 16 driving a chain 18.

A conveyor belt 20 is formed into an in-run 22, a spiral portion 24, an out-run 26, a take-up section 28 and a return run 30. A plurality of pulleys 32 shape conveyor belt 20 into its various parts.

Take-up section 28 includes a sprocket drive 34 for applying a predetermined longitudinal tension to out-run 26. A take-up loop 36 is formed by sprocket drive 34 and take-up pulleys 38 and 40. A take-up force 42, indicated by a downward-directed arrow, is applied to take-up pulley 38 to help form take-up loop 36. Take-up force 42 may be applied by any convenient means such as, for example, a pendant weight, not shown.

Spiral conveyor system 10 is illustrated as an up spiral or helix. Some applications employ a down spiral. Other applications combine an up spiral with a down spiral with the out-run of one feeding the in-run of the other.

Conveyor belt 20 is of a type which permits a limited amount of longitudinal telescoping to form spiral portion 24. Such types of conveyor belt are well known and are fully described in, for example, the above-referenced patents. Thus, further detailed description thereof is considered not required, except insofar as it is necessary to support the present detailed description.

In operation, sprocket drive 34 applies a predetermined longitudinal tension to out-run 26. This at least partly controls the tightness with which the inner edge of spiral portion 24 contacts the surface of capstan 12, and thus controls the friction between these elements. It is customary to permit capstan 12 to rotate at a speed which produces a surface velocity which exceeds the velocity of the inner edge of spiral portion 24 contacting capstan 12. This speed difference, called overdrive, is from a few percent to a few tens of percent. The amount of overdrive is conventionally adjusted by adjusting the amount of longitudinal tension applied by sprocket drive 34. In some applications, sprocket drive 34 is mechanically coupled to electric motor 16 for concerted action thereof. In other applications, sprocket drive 34 is driven by a separate apparatus, optionally under closed-loop control for maintaining a predetermined tension in out-run 26, or a predetermined speed of spiral conveyor system 10.

In the prior art, capstan 12 may have a solid surface, or may be formed of a plurality of vertical bars (not shown in FIG. 1). For the remainder of the present disclosure, the invention is described in the environment wherein capstan 12 is of the type formed of vertical bars. One skilled in the art will recognize that the invention is not limited to this environment, but may be applied to a capstan 12 having a solid, or other surface.

The problem to be solved is transferring sufficient driving force from capstan 12 to spiral portion 24, preferably while maintaining a satisfactory amount of overdrive.

Figure 2:
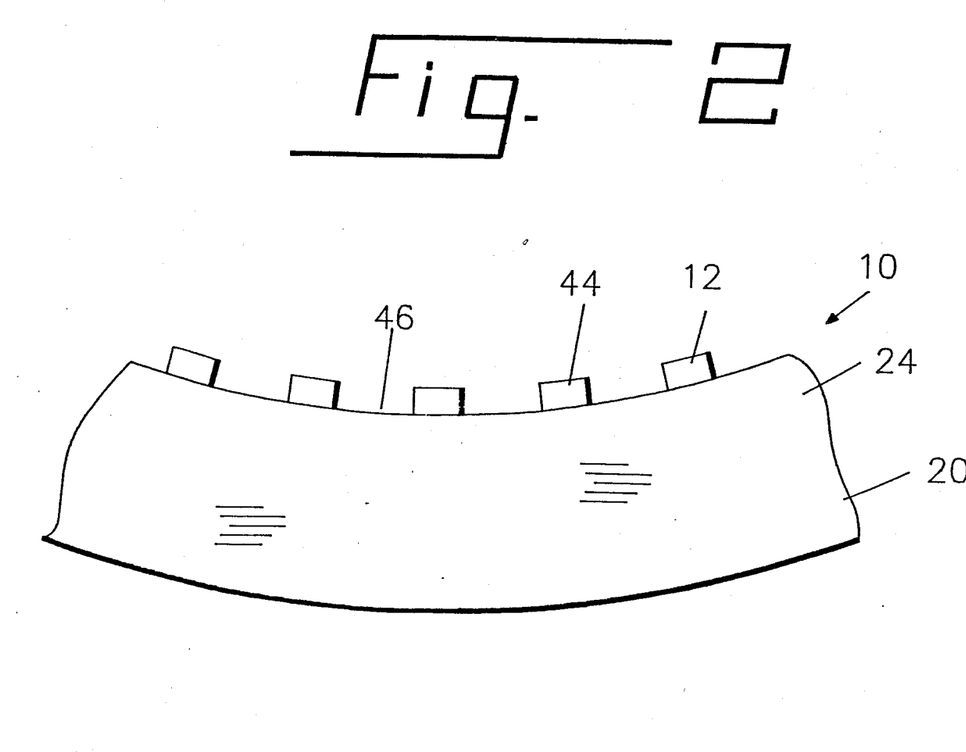
FIG. 2 is a view of the spiral conveyor of FIG. 1 to which reference will be made in describing the prior art and the present invention.

Referring now to FIG. 2, capstan 12 is essentially a cage constructed of a plurality of vertical bars 44 supported by conventional means to form an approximation of a cylindrical surface. It is friction at the interface between the outer surfaces of vertical bars 44 and an inner edge 46 of conveyor belt 20 which drive spiral portion 24.

Figure 3:
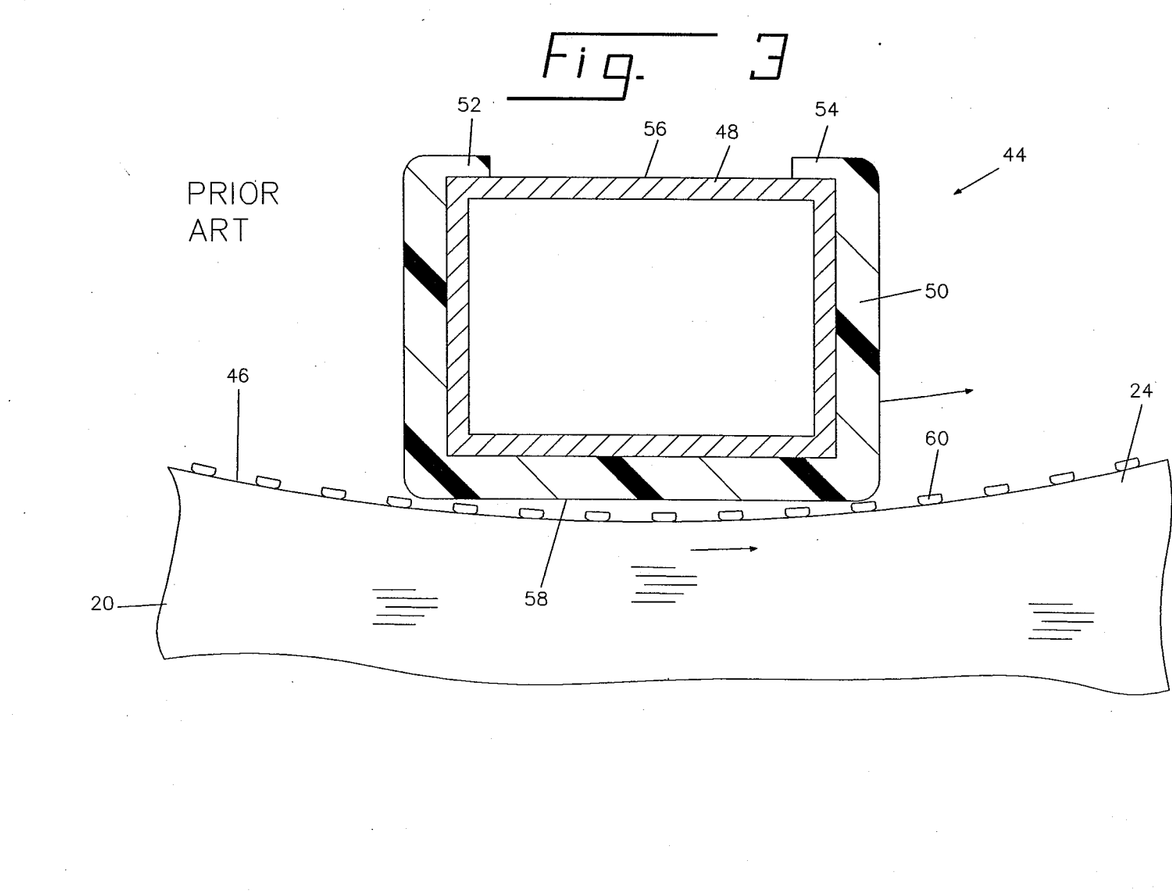
FIG. 3 is a close-up cross section of one vertical bar of FIG. 2, according to the prior art.

Referring now to FIG. 3, an enlarged cross section of vertical bar 44 is shown, together with an inner edge 46 of one type of conveyor belt 20. Vertical bar 44 includes a rectangular tube 48, upon which is clipped a U-shaped resin member 50. First and second lugs 52 and 54 grip an inner surface 56 of rectangular tube 48. An outer bearing surface 58 of U-shaped resin member 50 bears against inner edge 46. For purposes of description, conveyor belt 20 is assumed to be of a type wherein transverse bars (not shown) are terminated in an enlarged portion 60 optionally formed in a manner similar to the formation of nailheads. It will be seen that, in actuality, it is the surfaces of enlarged portions 60 which contact outer bearing surface 58 for the frictional transmission of motive force from vertical bar 44 to spiral portion 24.

Figure 4:
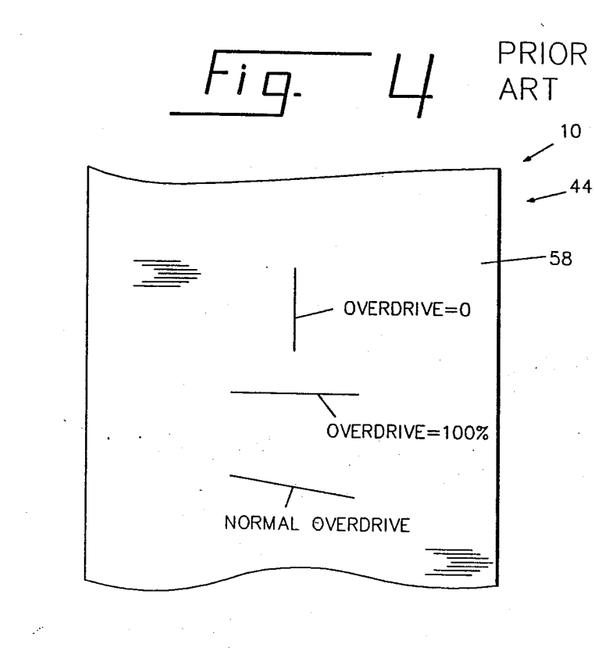
FIG. 4 is a side view of the vertical bar of FIG. 3.

Referring now to FIG. 4, a few basics of the operation of spiral conveyor system 10 will be described. The concept of overdrive must be understood. As spiral portion 24 rotates about capstan 12, at each revolution, spiral portion 24 experiences a change in height equal to the distance between tiers of spiral portion 24. If the peripheral speed of capstan 12 were exactly matched to the speed of inner edge 46, then a point on inner edge 46 would remain in the same transverse location on a outer bearing surface 58 as it rises or descends with its advancement about capstan 12. Thus this point on inner edge 46 would trace a vertical line on outer bearing surface 58, as indicated by a line labelled overdrive = 0. This is generally considered to be undesirable since experience has shown that this tends to develop substantial resistance to vertical motion conveyor belt 20. This arises, at least partly, from a tendency for points on inner edge 46 to catch on vertical bar 44.

From a practical standpoint, it is possible to discern the amount of overdrive that exists in a particular spiral conveyor system 10. With use, enlarged portions 60 leave easily visible scratches in outer bearing surface 58. The angle that these scratches make with a vertical line is indicative of the amount of overdrive.

If overdrive equals 100 percent, no motion of conveyor belt 20 is produced. This results in horizontal scratches, as shown in FIG. 4. This is, of course, undesirable since zero motion of conveyor belt 20 means that spiral conveyor system 10 is non-functional.

Normal overdrive of a few percent is indicated by a diagonal line as shown in FIG. 4. The angle that the scratch marks make with the vertical or horizontal are indicative of the amount of overdrive. The relationship between these angles and the actual amount of overdrive depends on the dimensions of the system. However, from a qualitative standpoint, the steeper the angle from the horizontal, the less the overdrive.

The overdrive experienced by a particular spiral conveyor system 10 can change with time due to changes in load, temperature, humidity and lubrication, among other things. Monitoring the angles of scratch marks on outer bearing surfaces 58 is a useful way of alerting a maintenance operator of changes in overdrive that may require correction.

Figure 5:
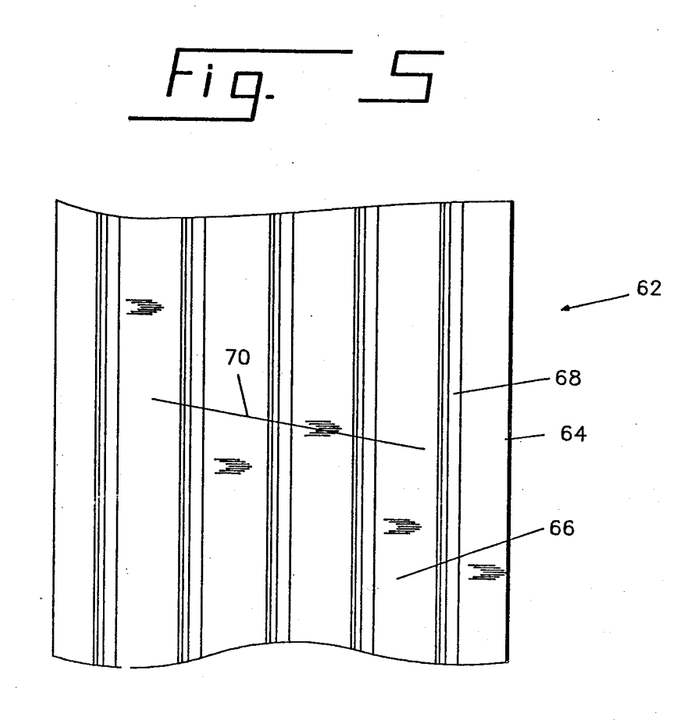
FIG. 5 is a side view of a vertical bar according to an embodiment of the invention.
Figure 6:
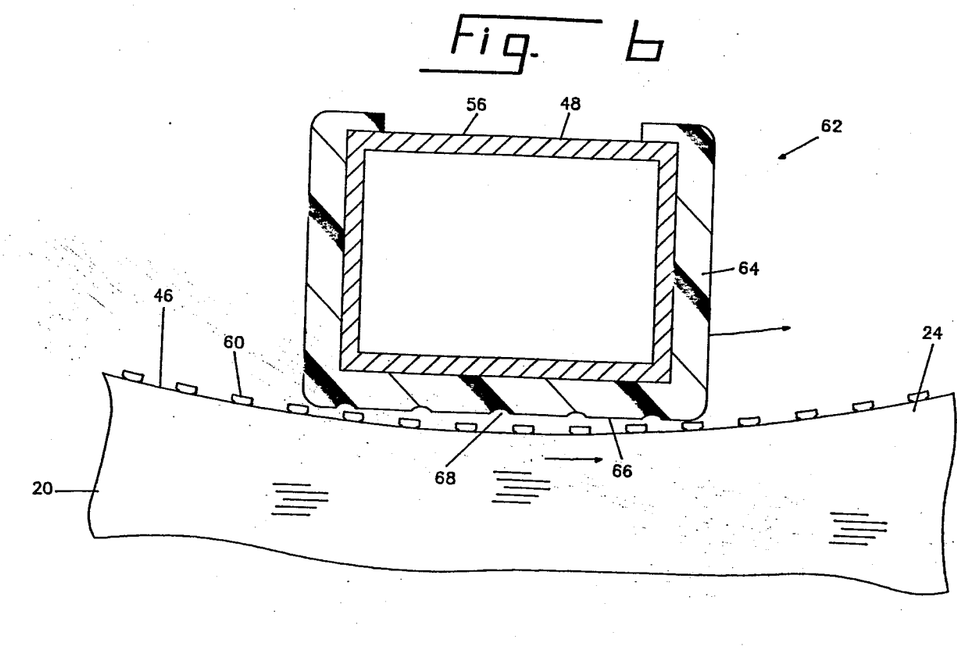
FIG. 6 is a close-up cross section of the vertical bar of FIG. 5.

As noted in the foregoing, as linear speeds increase, it becomes increasingly difficult to couple sufficient driving force between capstan 12 and spiral portion 24. Referring now to FIGS. 5 and 6, a vertical bar 62 is shown according to an embodiment of the invention. A U-shaped resin member 64 includes an outer bearing surface 66 having a plurality of shallow vertical grooves 68 therein. An angle of contact 70 produced by a reasonable amount of overdrive, is indicated by a diagonal line. The resulting irregularity in the outer bearing surface 66, as it contacts enlarged portions 60 increases the driving torque. However, several features prevent locking of outer bearing surfaces 66 into grooves 68, and thus a zero-overdrive situation, with resulting improper operation, is avoided.

First, it will be noted that grooves 68 are shallow, and thus have relatively gentle slopes. Thus, if an enlarged portion 60 enters a groove 68, it is capable of sliding up and out therefrom with a slight increase in friction. The cumulative effect of all of the slight increases in friction provides the desired increase in the transfer of motive force from vertical bar 62 to spiral portion 24.

Second, with one direction of rotation of capstan 12 (FIG. 1), angle of contact 70 tends to lift inner edge 46 of spiral portion 24 (FIG. 2). This tends to release any binding which may occur. With the opposite direction of rotation of capstan 12, angle of contact 70 tends to urge inner edge 46 downward. Some installations may take advantage of the downward urging to increase driving friction The vertical grooves 68 in vertical bar 62 offer the advantage that they can be formed during the extrusion of U-shaped resin member 64, without extra cost beyond a possible one-time tooling cost for a modified extrusion die. It is believed that some benefit may be attained by slanting the grooves so that they form a right angle with angle of contact 70.

Figure 7:
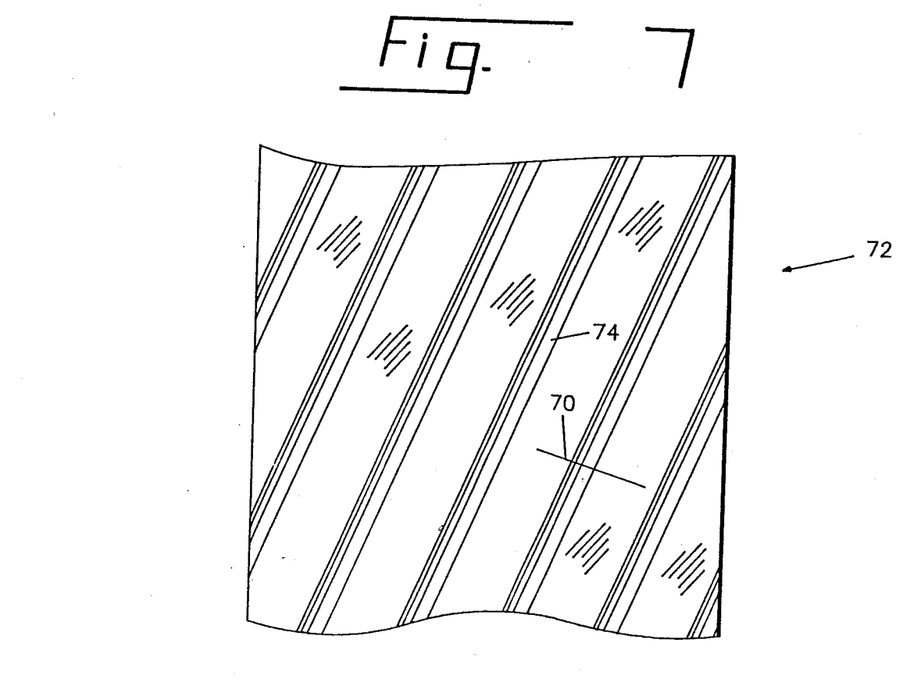
FIG. 7 is a side view of a vertical bar according to a further embodiment of the invention.

Referring to FIG. 7, a U-shaped resin member 72 is shown in which angled grooves 74 are disposed at right angles to angle of contact 70. This arrangement tends to maximize the increase in driving friction. It does, however, carry the disadvantage that angled grooves 74 cannot be formed during longitudinal extrusion of U-shaped resin member 72. Thus, if U-shaped resin member 72 is extruded, angled grooves 74 must be formed after extrusion by, for example, machining. If U-shaped resin member 72 is formed by casting, angled grooves 74 can be formed during the casting process.

Angled grooves 74 may be oriented at angles that do not make right angles with angle of contact 70. For example, if it is desired to lift or depress inner edge 46 (FIG. 2), then the angle of angled grooves 74 may be changed to accomplish this result. It is also within the contemplation of the invention to orient angled grooves 74 parallel to angle of contact 70. With this arrangement, enlarged portions 60 (FIG. 6) tend to ride within grooves 68. If the overdrive is increased above the design point as a result of changing environmental or other conditions, enlarged portions 60 will tend to climb out of angled grooves 74. When this occurs, an increase in cumulative friction tends to return the overdrive to the design point. It is further within the contemplation of the invention to provide two sets of angled grooves 74, one aligned generally with angle of contact 70, and the other inclined at a different angle to angle of contact 70. The second set may be at right angles, or at some other angle, to angle of contact 70 according to the principles discussed above. It is likely that the two sets of angled grooves 74 are preferably at right angles to each other, but this is not a requirement of the present invention. Relative angles other than 90 degrees are within the contemplation of the invention.

Some applications require the ability to withstand temperatures too high to be survived by resinous materials. In such applications, U-shaped resin members 50 may be omitted. Thus, driving contact may be between metallic elements without an intervening resin. Such an embodiment should be considered to fall within the scope of the present invention.

It will be evident that the present invention is directed toward increasing the amount of driving force that can be transmitted to conveyor belt 20. As described above, this increased driving force may be used to increase the speed at which belt 20 is advanced. It would be clear to one skilled in the art that the increased driving force is equally useful for driving a more heavily loaded belt 20 at the same speed, or even lower speed.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:
1. A spiral conveyor, comprising:
a conveyor belt;
said conveyor belt being of a type that is capable of telescoping at one edge to conform to a spiral shape;
a capstan;
said capstan being generally cylindrical with a vertical central axis;
means for rotating said capstan about said vertical central axis;
a peripheral surface on said capstan;
at least a portion of said conveyor belt being conformed in said spiral shape with an inner edge thereof contacting said peripheral surface;
means for applying a longitudinal tension to said conveyor belt at least in a vicinity of a departure of said conveyor belt from said spiral shape;
said inner edge including a plurality of protuberances;
a plurality of grooves in said peripheral surface; and
said plurality of grooves being shaped and disposed to interact with said plurality of protuberances to modify a cumulative friction between said inner edge and said peripheral surface;
said capstan includes a plurality of parallel vertical bars;
outer surfaces of said vertical bars forming said peripheral surface; and
said plurality of grooves being disposed in said outer surfaces.

2. A spiral conveyor according to claim 1, wherein:
a U-shaped resin member disposed on each of said vertical bars; and
outer surfaces of said U-shaped resin members forming said peripheral surface.

3. A spiral conveyor according to claim 2, wherein said plurality of grooves is aligned in a vertical direction.

4. A spiral conveyor according to claim 2, wherein said plurality of grooves is inclined at an inclination with respect to a vertical direction.

5. A spiral conveyor according to claim 4, wherein said inclination is generally at right angles to a relative motion of said inner edge with respect to said peripheral surface.

6. A spiral conveyor according to claim 4, wherein said inclination is generally parallel to a relative motion of said inner edge with respect to said peripheral surface.

7. A spiral conveyor according to claim 1, wherein:
an inclination of said plurality of grooves providing a modification in a friction between said peripheral surface and said inner edge.

8. A spiral conveyor according to claim 1, wherein said plurality of grooves is aligned in a vertical direction.

9. A spiral conveyor according to claim 7, wherein said inclination is generally at right angles to a relative motion between said peripheral surface and said inner edge.

10. A spiral conveyor according to claim 7, wherein said inclination is generally parallel to a relative motion between said peripheral surface and said inner edge.

* * * * *